United States Patent [19]

Bryer

[11] 3,866,855

[45] Feb. 18, 1975

[54] TAPE TENSION AND VELOCITY CONTROL SYSTEM

[75] Inventor: Philip Stuart Bryer, Woodland Hills, Calif.

[73] Assignee: Wangco Incorporated, Los Angeles, Calif.

[22] Filed: Oct. 24, 1972

[21] Appl. No.: 299,719

[52] U.S. Cl. .................... 242/184, 226/45, 226/95, 226/113, 226/118, 242/185

[51] Int. Cl. .................... B65h 17/02

[58] Field of Search .................... 242/183–185; 226/45, 42, 95, 113, 118

[56] References Cited

UNITED STATES PATENTS

| | | | |
|---|---|---|---|
| 3,047,198 | 7/1962 | Long | 226/45 X |
| 3,137,453 | 6/1964 | Wooldridge | 242/184 |
| 3,189,239 | 6/1965 | Brumbaugh | 226/118 X |
| 3,254,854 | 6/1966 | Deighton | 226/118 X |
| 3,258,213 | 6/1966 | Fronckowiac | 242/183 |
| 3,424,915 | 1/1969 | Youngstrom | 226/45 X |
| 3,563,492 | 2/1971 | Ferrier | 242/184 |
| 3,701,494 | 10/1972 | Proulx | 242/184 |

*Primary Examiner*—Richard A. Schacher
*Attorney, Agent, or Firm*—Henry M. Bissell

[57] ABSTRACT

Systems for controlling the movement of a web, such as magnetic tape, on which information is processed, employing strategically positioned vacuum buffers and control mechanisms. A pocket or auxiliary vacuum buffer is positioned in the near vicinity of the tape head and controlled to eliminate minor fluctuations in velocity and tape tension resulting from the inertia of the tape itself. Various linearizing vacuum buffer arrangements are employed to simplify the servomechanism control of the tape drives in response to vacuum in the main tape loop buffer chambers.

19 Claims, 8 Drawing Figures

TAPE TENSION AND VELOCITY CONTROL SYSTEM

BACKGROUND OF THE INVENTION

1. Field of the Invention

This invention relates to information processing apparatus and, more particularly, to mechanisms for controlling the tension and velocity of a movable web, such as a magnetic tape, employed in such apparatus. It is particularly applicable to digital tape transports.

2. Description of the Prior Art

Precise control of tape speed, tension and start-stop time is important, indeed critical, in many applications of tape transports developed for the data processing field. These factors are, of course, interrelated. Vacuum buffer systems and are generally employed in such transports in order to develop one or more loops of tape which have the effect of isolating the segment of tape at the transducer or head and associated drive system from the considerably larger inertial loads presented by the tape reels themselves. Several systems of various types are utilized to provide control of the reel drive motors from the portions of the transport that develop the tape loops. Examples of vacuum buffer systems may be found in the Comstock U.S. Pat. No. 3,016,207 and the Schoeneman U.S. Pat. Nos. 3,176,894 and 3,091,408. Examples of systems for converting tape loop information to signals for controlling the reel drive motors may be found in the U.S. Pat. Nos. 3,016,207 and 3,091,408. In general, such systems as are known develop non-linear control signals which call for the provision of compensating devices or particular techniques involving non-linear response mechanisms for effective operation. Even so, the range of operation of such devices is usually limited by the design techniques employed.

From the standpoint of simplicity, reliability, economy of manufacture and maintenance, and overall performance, it is often preferable to employ actuators and servocontrol systems which are linear in operation. In the present application this results in an improved system for controlling digital tape transports.

It is therefore a general object of the present invention to develop a linearized response servocontrol system for magnetic tape drives and equivalent apparatus.

It is a further object of the present invention to provide a simplified and more precise system for controlling the tension and velocity of a web material such as magnetic tape in a transport for data processing apparatus.

SUMMARY OF THE INVENTION

In brief, particular arrangements in accordance with the present invention comprise a tape transport which develops suitable buffering loops on opposite sides of the head and tape drive mechanism. The tape loops are maintained by vacuum applied to tape buffering chambers. The position of the tape loops within the chambers is sensed by detection of the vacuum therein, since an established vacuum exists on one side of the tape loop while the other side is at ambient pressure.

This is accomplished in one particular arrangement in accordance with the invention by providing a number of holes of varying size and spacing along the working length of the chamber, which holes are pneumatically connected to a cavity or plenum adjacent but otherwise separated from the chamber. A piston connected with the plenum cavity is arranged to act upon a cantilever beam such that changes in pressure within the cavity cause the cantilever beam to deflect due to the force applied by the piston. A portion of the cantilever beam is used as a light shutter to control the light which is incident upon an electrical cell positioned behind the beam from a light source in front of it. Thus the deflection of the cantilever beam causes changes in the electrical signals generated by the phototransducer cell and these signals are applied to control the tape reel drive motors. The cell output signal is proportional to the pressure in the plenum because of the linear relationships respectively between piston force and plenum pressure, cantilever deflection and piston force, and cell output and cantilever deflection. Conversion of the positions of the tape loops within the buffer chambers to linear variations in plenum pressure is achieved in accordance with the present invention by the provision of a servobar separating the buffer and plenum chambers, which bar contains a plurality of holes of varying size and spacing. The actual arrangement of the holes (including the shapes as well as size and spacing) may be varied, if need be, to suit individual requirements. Thus systems in accordance with the present invention permit simplification of the tape control apparatus for improved economy and reliability.

In another particular arrangement in accordance with the invention, the tape itself in a particular portion of the tape loop within a given buffer chamber is utilized as a variable vane or shutter to control the area of a photocell which is exposed to light from a light source on one side of the tape. In this arrangement, one side of the buffer chamber is particularly shaped so as to develop a different tape angle at the photocell, depending upon the extent of the loop within the chamber. This side of the buffer chamber is shaped so as to develop a linear relationship between extent of tape loop and degree of exposure of the photocell. Thus, the desired linearization between the extent of the tape loop and the output signal of the photocell which is directed to the reel motor drive circuitry is achieved with a minimum of expense and the utmost in simplification and reliability of equipment.

In accordance with a further aspect of the invention, damping of tape velocity fluctuations at the transducer head which result from high tape accelerations and effective inertia of the tape loops themselves is achieved by the provision of a buffer arrangement which is situated outside the buffer chamber between the head and the inertial load. Such a buffer must have a minimum inertia itself for it to be effective, and this invention utilizes a vacuum pocket and related control system. This system incorporated a variable impedance orifice situated between the vacuum pocket and vacuum course, which permits the vacuum in the pocket to be varied over a range not exceeding source vacuum, this developing the desired control of the tape within this pocket. The vacuum pocket is located outside of and apart from the vacuum buffer chambers previously referred to in order to provide improved damping of the tape velocity fluctuations resulting from tape loop inertia.

BRIEF DESCRIPTION OF THE DRAWINGS

A better understanding of the present invention may be had from a consideration of the following detailed description, taken in conjunction with the accompanying drawings, in which.

DESCRIPTION OF THE PREFERRED EMBODIMENT

Figure 1:
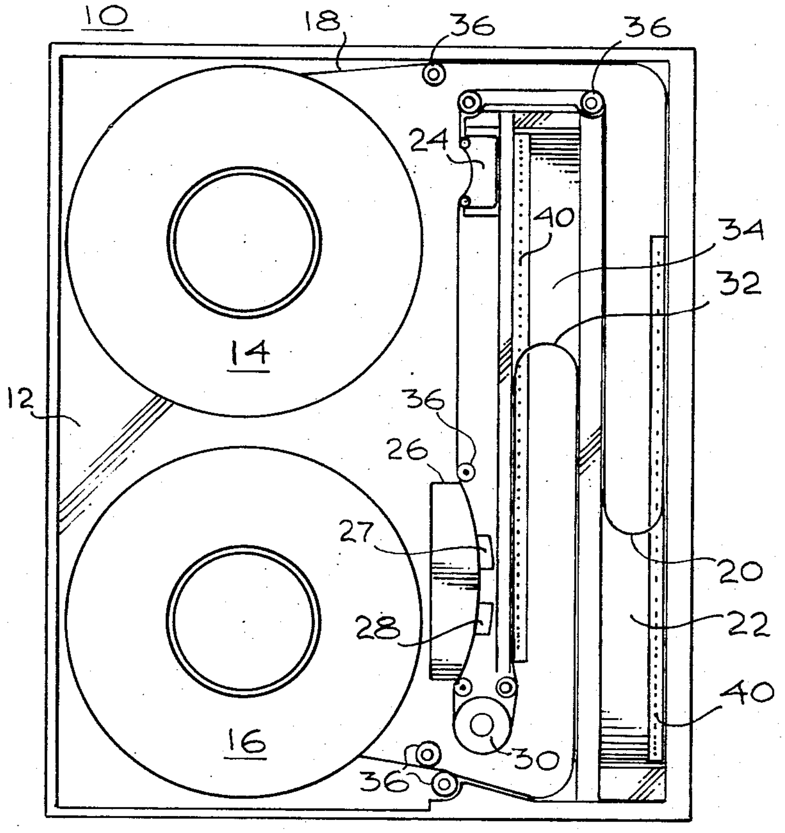
FIG. 1 is a view of the face of a tape transport in accordance with the present invention showing the tape path between supply and takeup reels, and various elements related thereto.

FIG. 1 is a front view of a tape transport 10 including arrangements in accordance with the present invention. The transport 10 is shown comprising a frame 12 on which are mounted a supply reel 14 and a take-up reel 16. Suitable drive motors and controls for the reels 14 and 16 are mounted out of sight behind the reels. A length of tape 18 is shown extending between the reels 14 and 16 through a normal operative path comprising a first tape loop 20 in a first vacuum buffer chamber 22; a pucker pocket or auxiliary buffer chamber 24; a magnetic head region 26 which, for purposes of the present invention, is non-specific as to construction and may be understood to comprise one or more read-write and erase heads such as 27 and 28; a drive capstan 30; and a second tape loop 32 within a second vacuum buffer chamber 34. Assorted tape guides and rollers such as 36 are situated along the tape path to help guide the tape 18. Reference is made to servobar 40 located in each of the vacuum buffer chambers 22, 34, which is shown and described in more detail in connection with FIGS. 4 and 5.

Figure 2:
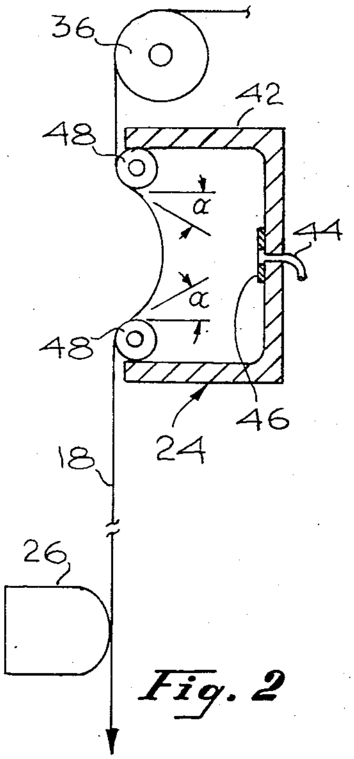
FIG. 2 is an enlarged view of a portion of the arrangement of FIG. 1, showing particular detail thereof.

Details of the auxiliary buffer chamber or pocket 24 are shown in FIG. 2 which is a partial schematic diagram illustrating the chamber 24 in section. The auxiliary buffer chamber 24 is shown having walls 42 and an opening 44 in the rear wall 42 which will be understood to communicate with a vacuum source (not shown) which is common to the buffer chambers of the transport 10. An orifice member 46 is shown positioned at the opening 44 to determine the effective size of the opening 44. Near the front opening of the auxiliary buffer chamber 24 are a pair of tape guides 48 which serve to guide the tape 18 into and out of the auxiliary buffer chamber 24 in its path past the head 26 and around the guides 36 between the first and second tape loops of the first and second buffer chambers (see FIG. 1). Where the tape enters and leaves the auxiliary buffer chamber 24 around the tape guides 48, an angle $\alpha$ is shown defined between a line tangent to the tape and a line which is normal to the path of the tape past the chamber 24.

In this system, the force acting on the tape 18 at the front (left-hand) opening of the chamber 24 is constant, since the opening is constant in size. An equation for the system to be in equilibrium can be expressed as $$T = F / 2\cos\alpha \tag{1}$$

where $\alpha$ is the angle at the tangent point of the tape 18 at the guide 48, $T$ is the tape tension (also considered as the static tension of the tape) and the $F$ is the force acting on the tape at the front opening of the chamber 24. The tape tension $T$ at the head 26 is constant except during acceleration, when the inertial forces on the tape 18 either add to or subtract from the static tape tension, depending on the direction of the acceleration. In the equation (1), changes in $T$ will therefore cause $\alpha$ to change, meaning that the extent of the tape 18 within the chamber 24 will vary. This chamber 24 then becomes a buffer to the head 26 and, as the tape acceleration cycle is completed, equilibrium is restored by the tape 18 returning to its original value of $T$ in the chamber 24.

The value of $\alpha$ in equation (1) is controlled by means of the variable impedance orifice 46 between the chamber 24 and source vacuum. This in effect allows the vacuum in the chamber 24 to be varied over a range up to source vacuum.

Figure 3:
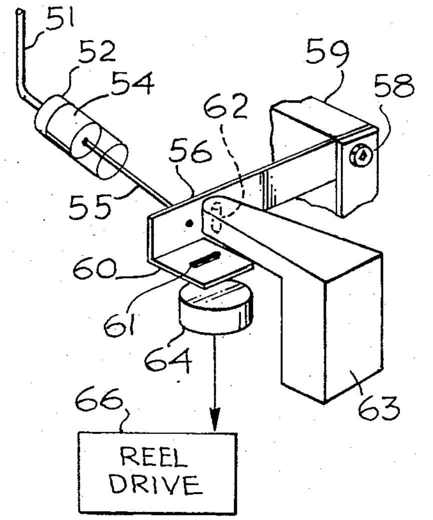
FIG. 3 is a combination block and schematic diagram illustrating a servocontrol system in accordance with the present invention as utilized in conjunction with the arrangement of FIG. 1.

FIG. 3 represents in schematic form the arrangement of a servosystem for controlling the drive to the reels 14 and 16 through the sensing of the extent of the tape loops 20, 32 in their respective buffer chambers 22, 34. In FIG. 3, which is a simplified perspective view of operative elements of a tape loop servosystem of the tape transport 10 of FIG. 1, the connection to a plenum chamber associated with the vacuum buffer chamber (see FIG. 5) is shown as a pneumatic tube 51. The tube 51 communicates with a cylinder 52 in which a piston 54 is positioned for movement within the cylinder 52 in response to the vacuum present in the tube 51. The piston 54 is connected via a rod 55 to a cantilever bar 56 rigidly fastened at its inboard end 58 to a frame mounting 59 and bearing a slotted card 60 mounted to vary the extent of the light from a lamp 62 supported on a lamp mount 63 which is passed to a transducer 64, such as a photocell or phototransistor, which develops an output signal to control the reel drive system 66 for the associated tape reel 14 or 16. One such system is provided for each pair of tape reel buffer chamber combinations.

Figure 4:
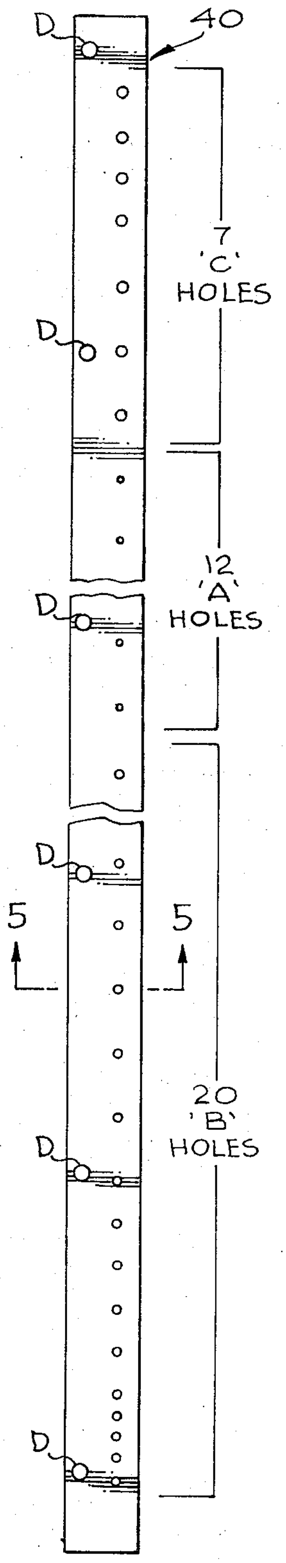
FIG. 4 is a diagram showing details of construction of a particular component employed in the arrangement of FIG. 1.
Figure 5:
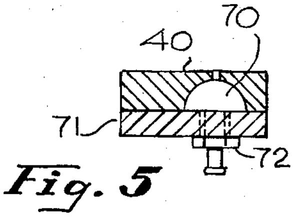
FIG. 5 is a sectional view taken along the line 5—5 of FIG. 4.

The vacuum is supplied to the buffer chambers 22, 24 (FIG. 1) in conventional fashion from a vacuum source (not shown) and the extent of the tape loop in the buffer chamber 22 or 24 is sensed by the vacuum developed in the associated plenum chamber behind the vacuum chamber through holes in the servobar 40. The piston 54 causes a varying deflection of the cantilever beam 56 in response to the vacuum of the plenum chamber, thus varying the intensity of the light reaching the photocell 64 and hence varying its output signal proportionately. In the preferred embodiment, the plenum chamber is simply an enlarged slot or recess communicating with the air holes in the face of the bar 40. The actual structural details of the servobar 40 are shown in FIGS. 4 and 5, FIG. 5 being a sectional view taken along the line 5—5 of FIG. 4, looking in the direction of the arrows. As shown in FIG. 4 certain portions of the bar have been omitted in order that the view may be shortened for presentation on one sheet of drawing. The omitted sections are merely repetitive of adjacent sections and may be adequately described by reference thereto.

Insofar as function is concerned, there are two types of holes in the bar 40: the screw holes located along the lefthand side of the bar 40 in FIG. 4 and labelled D, and the air holes located along the right-hand side of the bar 40. The air holes are divided into three categories as to size. There are seven C holes beginning from the top of the bar, each having a diameter of 0.026 inches. There are 12 A holes beginning adjacent the lowermost C hole and continuing downward therefrom, each having a diameter of 0.0225 inches. There are 20 B holes extending from the lowermost A hole and continuing downward to the bottom of the bar 40, each having a diameter of 0.024 inches. All of the air holes are in line with each other, with the centers being spaced 0.173 inches from the right-hand edge of the bar 40. The bar 40 is 0.49 inches in width and the centers of the screw holes D are located 0.4 inches from the right-hand edge of the bar 40. The uppermost D hole is 0.25 inches from the top end of the bar 40 and successive D holes are positioned in line therewith, being spaced each 2.125 inches on centers. The uppermost C hole is spaced 0.525 inches from the top of the bar 40. The next three C holes are spaced at successive 0.3-inch intervals on centers. The final three C holes, all 12 of the A holes, and the uppermost 11 of the 20 B holes are successively spaced on centers at 0.45 inch intervals. The next five B holes are spaced therebelow on 0.3 inch centers with the last four B holes being spaced at 0.15 inch intervals. The bar is 15.75 inches long and 0.125 inches thick.

As may be seen in FIG. 5, a semi-circular slot 70 or recess extends along the underside of the bar 40, communicating with each of the air holes A, B and C, with the centers of the air holes being located on an extended radius of the slot 70. The slot 70 has a radius of 0.093 inches, which is about three times the air hole depth of approximately 0.03 inches. The servobar 40 is shown in FIG. 5 as mounted adjacent a backing plate 71 in which a tube fitting 72 is threadably inserted for communication between a vacuum tube 51 (FIG. 3) and the plenum chamber (slot 70). The slot 70 terminates about 0.04 inches short of each end of the bar 40, thus constituting a completely enclosed plenum chamber when installed in the vacuum chamber, open only to the holes of the servobar and the output connection to the piston 54 (FIG. 3).

The servobar 40 as shown and described in connection with FIGS. 4 and 5 constitutes a convenient solution to the problem of constructing a chamber which has holes in its face and a cavity communicating with the holes behind the apertured surface. In use, the servobar 40, constructed in the fashion described, is recessed in the face of the buffer chamber 22 or 34, as the case may be, so that the slot 70 forms an airtight cavity or plenum communicating with the air holes along its face and sealed at the rear by the surface of the back plate 71 of the buffer chamber. The screws or other fastening means positioned in the holes D are mounted with their heads flush with the upper surface of the servobar 40. For a given position of the tape loop

20 or 32 in the chamber 22 or 34, a number of the air holes of the servobar 40 will be at system vacuum (outside the tape loop) while the remainder inside the tape loop are at atmospheric pressure. Therefore the vacuum within the plenum comprising the slot 70 will be at some level between system vacuum and atmospheric pressure depending upon the proportion of the air holes at source vacuum. By arrangement of the hole shape, diameters and spacing as shown and described herein for the servobar 40, the vacuum in the plenum slot 70 can be made proportional to the position of the tape loop in the buffer chamber. Thus, since as indicated in FIG. 3 there is linear proportionality between call output, cantilever bar deflection and piston force, linear proportionality is provided between tape loop position and cell output. As a consequence, the reel drive servo 66 (FIG. 3) is controlled by an electrical signal which is proportional to the tape loop position in the chamber adjacent the associated tape reel 14 or 16.

Figures 6, 7, 8:
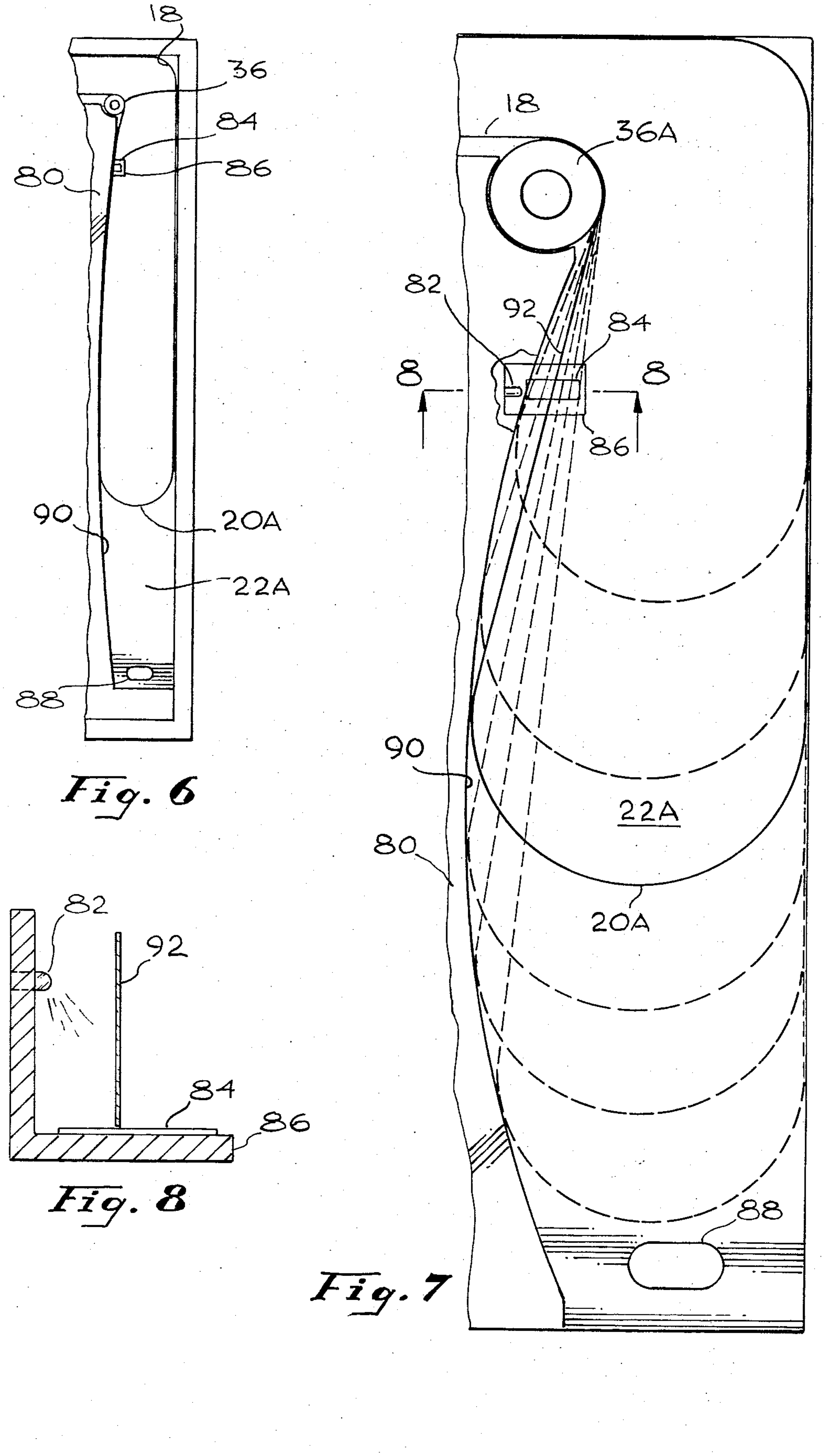
FIG. 6 is a view of a portion of the apparatus of FIG. 1 showing an alternative arrangement of a linearizing tape loop servo system in accordance with the invention.
FIG. 7 is an enlarged and somewhat exaggerated representation of the portion shown in FIG. 6, illustrating this particular arrangement in accordance with the invention; and, FIG. 8 is an enlarged sectional view of a portion of FIG. 7, taken along the line 8—8.

Details of the structure of an alternative linearizing system for developing an electrical output signal which is proportional to the extent of tape loop within a vacuum buffer chamber are shown in FIGS. 6–8. FIG. 6 illustrates a portion along the right-hand side of the tape transport 10 depicted in FIG. 1. As an alternative arrangement to the servo bar structure 40, the vacuum chamber 22A of FIG. 6 incorporates a specially shaped side wall member 80 in conjunction with a lamp 82 and phototransducer 84 mounted on a block 86. Vacuum is supplied to the chamber 22A via an orifice 88 which may be of suitable size and shape and which connects with a conventional vacuum source (not shown).

As shown particularly in FIG. 7, the side wall member 80 is shaped to present a concave arcuate surface 90 along the lefthand side of the vacuum buffer chamber 22A. This surface 90 is shaped so as to cause the tape of the loop 20A, particularly in the segment 92 thereof which is adjacent the block 86, to follow a predetermined path, the angle of which varies in accordance with the extent of the tape loop 20A. As may be seen in FIG. 8, which is a section of FIG. 7 taken along the lines 8—8 and looking in the direction of the arrows, the tape segment 92 acts as a shutter or vane to control the amount of light from the lamp 82 which is incident upon the phototransducer surface 84. (Connections for supplying power to the lamp 82 and for transmitting the output of the phototransducer 84 are omitted for simplicity.) The amplitude of the voltage output of the phototransducer 84 is proportional to the area thereof which is exposed to the lamp 82. This area changes proportionally to the variable angle of the tape 92 which, by virtue of the curved surface 90 is rendered proportional to the extent of the loop 20A within the chamber 22A. The broken line paths in FIG. 7 represent varying positions of the tape segment 92 and tape loop 20A. In operation, the curved arm portion of the loop 20A is a semi-circle and the straight line segment 92 is tangent to the semi-circle at the horizontal diameter thereof, as shown in FIG. 7.

Since the specially shaped buffer chamber wall member 80 is located between the two buffer chambers of the tape transport 10 of FIG. 1 and is common to both, it is relatively simple to machine the single member 80 with two opposite concave arcuate surfaces 90 and to include two lamp 82 and phototransducer 84 combinations to perform the same function for both of the vacuum buffer chambers. While the surface 90 is shown as a cylindrical segment, other arrangements which depart from the generally planar configuration of prior art buffer chamber walls may be employed as, for example, a waffled surface or some other non-linear surface to develop the desired linearization between tape loop position and output signal representative thereof. This particular arrangement of a linearized tape loop servo system provides distinct advantages over known prior art arrangements, in that it is relatively immune to the effects of dirt and tape residue buildup within the chamber. Moreover, it is generally desirable to provide an antistatic strip along the surface 90 as well as along other surfaces contacted by the tape within the buffer chamber and this is readily possible without interfering with the operation of the system as shown in FIGS. 6–8, whereas in certain known prior art systems such is not the case.

The combination of an auxiliary vacuum buffer chamber adjacent the tape head outside the main buffer chambers together with a system for linearizing tape reel drive control from tape loop position in the main vacuum buffer chambers results in both simplification and improved performance in tape transport arrangements in accordance with the present invention. Such arrangements are more economical to manufacture, more reliable in operation, longer lasting and more free from maintenance than the more complicated but less effective apparatus of the prior art.

Although there have been described above specific arrangements of a tape tension and velocity control system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. Apparatus for controlling a web member such as a magnetic tape comprising:

- pickup and supply reels for said tape;
- means for guiding said tape along a predetermined path including a tape head from one to the other of said reels;
- tape drive means for frictionally engaging the tape to drive it along the path;
- reel drive means for driving said reels;
- at least one main vacuum chamber for developing at least one buffering loop in said tape along said path;
- means for developing a control signal proportional to the extent of the loop in said chamber, said means comprising a transducer responsive to a selected parameter which varies within limits as the length of the tape loop is varied and a wall portion of said chamber having a predetermined non-linear configuration selected to linearize the relationship between the selected parameter and the length of the tape loop;
- means for controlling the reel drive means in response to said control signal; and
- means defining a plenum chamber adjacent the vacuum chamber, the wall portion including means for controlling the pressure in the plenum chamber in accordance with the extent of the tape loop in the vacuum chamber.

2. Apparatus in accordance with claim 1 further comprising:

- a piston responsive to the pressure in the plenum chamber;
- a cantilever beam coupled to the piston for movement in response thereto; and
- means responsive to movement of the cantilever beam for developing a proportional control signal.

3. Apparatus in accordance with claim 1 wherein the wall portion comprises an apertured member having a predetermined arrangement of apertures varying in size and juxtaposition for communicating between the vacuum chamber and the plenum chamber.

4. Apparatus in accordance with claim 1 wherein the wall portion comprises an elongated bar mounted along the wall of the vacuum chamber and having a plurality of variably spaced and sized apertures extending transversely between the face of the bar adjacent the vacuum chamber and the plenum chamber.

5. Apparatus in accordance with claim 4 wherein the plenum chamber comprises a slot extending along the face of the bar remote from the vacuum chamber and communicating with said apertures.

6. Apparatus in accordance with claim 5 wherein said slot is semi-circular in cross-section with a radius approximately three times the depth of the apertures communicating therewith.

7. Apparatus in accordance with claim 4 wherein said apertures comprise circular holes aligned side by side in a single row and arranged in three different size categories.

8. Apparatus in accordance with claim 7 wherein the bar contains 39 holes communicating with the plenum chamber, the seven holes nearest the opening of the vacuum chamber being largest in diameter, the 20 holes farthest from the opening of the vacuum chamber being intermediate in diameter, and the remaining 12 holes positioned along an intermediate section of the bar being smallest in diameter.

9. Apparatus in accordance with claim 8 wherein the largest holes are approximately 0.026 inches in diameter, the intermediate size holes are approximately 0.024 inches in diameter, and the smallest size holes are approximately 0.0225 inches in diameter.

10. Apparatus in accordance with claim 7 wherein the holes are arranged in four groups according to spacing.

11. Apparatus in accordance with claim 10 wherein the first four holes nearest the opening of the vacuum chamber are equally spaced at approximately 0.3 inches on centers, the spacing on centers to the next 26 holes is approximately 0.45 inches, the spacing on centers to the next five holes is approximately 0.3 inches, and the spacing on centers to the next four holes in approximtaly 0.15 inches.

12. Apparatus in accordance with claim 1 comprising:

- a pair of main vacuum chambers positioned in side-by-side relationship and having respective open ends at opposite sides of the tape head and tape drive means for developing respective buffering loops at opposite sides of said head and tape drive means; and
- independent control signal developing means associated with respective ones of the main vacuum chambers.

13. Apparatus in accordance with claim 12 further including an auxiliary vacuum chamber adjacent the head on the side thereof remote from the tape drive means and positioned along the tape path between the opening of the main vacuum chamber on said side of the head and the head itself.

14. Apparatus in accordance with claim 13 wherein said auxiliary vacuum chamber includes a variable impedance orifice for controlling the vacuum within the auxiliary chamber.

15. Apparatus for controlling a web member such as a magnetic tape comprising:

pickup and supply reels for said tape;

means for guiding said tape along a predetermined path including a tape head from one to the other of said reels;

tape drive means for frictionally engaging the tape to drive it along the path;

reel drive means for driving said reels;

at least one main vacuum chamber for developing at least one buffering loop in said tape along said path;

means for developing a control signal proportional to the extent of the loop in said chamber, said means comprising a photocell and associated light source mounted along the web member path within the vacuum chamber such that an adjacent segment of the web member loop acts as a light shield which varies the amount of radiant energy incident on the photocell in accordance with the angle of the loop segment, and a wall portion of said chamber having a predetermined non-linear configuration selected to linearize the relationship between the amount of radiant energy icident on the photocell and the length of the tape loop, said wall portion comprising a non-planar side wall shaped to change the angle of said loop segment relative to the photocell in accordance with variations in extent of the loop in the chamber; and means for controlling the reel drive means in response to said control signal.

16. Apparatus in accordance with claim 15 wherein the non-planar side wall comprises a concave arcuate surface extending generally along one side of the loop and developing different angles of tangency for said one side of the loop in accordance with the position of the loop within the chamber.

17. Apparatus in accordance with claim 15 wherein said non-planar side wall is arranged to vary the area of the photocell receiving light from the light source in proportion to the extent of the loop within the chamber.

18. The method of controlling a system for driving a web member such as a magnetic tape by developing an electrical signal which is proportional to the extent of the loop of the web member within a vacuum chamber, comprising the steps of:

establishing a vacuum in said chamber;

admitting a loop of said web member within the chamber under the influence of said vacuum;

directing radiation from a radiant energy source toward a transducer associated with the chamber;

controllably varying the amount of said radiation reaching said transducer in proportion to the extent of the loop of said member within the vacuum chamber by varying the position of a cantilevered member mounted to variably obstruct the path of radiation between the source and the transducer; and applying the output of the transducer to the web member drive system.

19. The method of claim 18 further comprising the step of applying a selected portion of the vacuum established in the vacuum chamber to a pressure responsive member connected to the free end of the cantilevered member.

* * * * *